Oct. 27, 1936.  S. M. WECKSTEIN  2,059,068
BEARING SEAL
Filed Feb. 23, 1935

INVENTOR:
Samson M. Weckstein,
by Cantlan & Gravely,
HIS ATTORNEYS.

Patented Oct. 27, 1936

2,059,068

UNITED STATES PATENT OFFICE 2,059,068

BEARING SEAL

Samson M. Weckstein, Canton, Ohio, assignor to The Timken Roller Bearing Company, Canton, Ohio, a corporation of Ohio Application February 23, 1935, Serial No. 7,664

2 Claims. (Cl. 288—1)

My invention relates to sealing means for bearings, particularly roller bearings. It has for its principal object a construction which is strong and durable and which will form an effective seal against escape of oil from the bearing and entrance of foreign matter into the bearing.

The invention consists principally in the bearing seal and in the parts and combinations and arrangements of parts hereinafter described and claimed.

In the accompanying drawing, which forms part of this specification and wherein like symbols refer to like parts wherever they occur.

Fig. 1 is a longitudinal sectional view of a mine car wheel construction provided with bearing seals embodying my invention;

Fig. 2 is an enlarged sectional view of the seal;

Figs. 3, 4, 5 and 6 are detail views of component parts of the seal.

In the drawing is illustrated a mine car wheel bearing including a wheel 1 having a hollow hub 2 and an axle 3 extending therethrough, with taper roller bearings 4 interposed between the axle and the bore of the wheel.

Seated against a shoulder 5 on the axle 3 at the innermost end of the wheel 1 is a collar 6 whose end is spaced from the adjacent inner bearing cone 7 and an annular washer 8 is disposed in the space between said collar 6 and said inner bearing cone 7, the outside diameter of said washer being smaller than the inside diameter of the wheel hub 2. Mounted on said washer 8 is an angular supporting ring 9 having a body portion 10 resting flatwise against the peripheral portion of the face of the washer 8 that is disposed toward the outside of the wheel bore, a flange 11 engaging the periphery of said washer 8 and a marginal lip 12 bent over the other face of the washer 8 to hold the supporting ring 9 in place. At its inner periphery said supporting ring 9 has an annular flange 13 that is concentric with and parallel to the axis of the bearing.

On said supporting flange 13 is a sealing ring 14 whose body is disposed flatwise against the body 10 of said supporting ring 9 and which has an angular marginal portion 15 whose outer surface forms a seal against the bore of the wheel hub 2. A retaining ring 16 for said sealing ring 14 is likewise mounted on said flange 13, said retaining ring 16 having an angularly disposed resilient marginal portion 17 that engages the inner periphery of said flange 15 of the sealing ring 14 holding it in engagement with the wheel bore. A positioning ring 18 is mounted on said supporting flange 13 in engagement with said retaining ring 16 and a marginal securing lip 19 on said flange 13 holds the sealing ring 14, retaining ring 16 and positioning ring 18 in place on said flange 13 of the supporting ring 9. The collar 6 is rabbeted around the periphery of its inner face to provide an angular recess 20 for receiving the sealing device.

At the outer end of the axle the collar 6 is seated against a positioning nut 21 on said axle, the construction of the seal itself being the same as that at the inner end of the seal.

Preferably the outer periphery of each collar 6 is provided with the usual sealing grooves 22. Each collar may be provided with a notch 23 to receive a tongue 24 on the washer 8, so that the washer is held against creeping movement.

The above described construction is especially adapted for mine car and other heavy duty service. A very effective seal is formed, yet the device is simple in construction and easy to assemble.

Obviously, numerous changes may be made without departing from the invention and I do not wish to be limited to the precise construction shown.

What I claim is:

1. A seal comprising an annular washer, an angular supporting ring having a body portion resting flatwise against the peripheral portion of a face of said washer, a flange engaging the periphery of said washer and a marginal lip bent over the other face of said washer to hold said support thereon, said supporting ring also having a flange around its inner periphery, a sealing ring seated on said flange and resting against said body portion of said supporting ring and having a flanged marginal portion and a retaining ring mounted on said flange for holding said sealing ring in place, said retaining ring having a resilient marginal portion engaging said flange of said sealing ring.

2. A seal comprising an annular washer, an angular supporting ring having a body portion resting flatwise against the peripheral portion of a face of said washer, a flange engaging the periphery of said washer and a marginal lip bent over the other face of said washer to hold said support thereon, said supporting ring also having a flange around its inner periphery, a sealing ring seated on said flange and resting against said body portion of said supporting ring and having a flanged marginal portion, a retaining ring mounted on said flange for holding said sealing ring in place, said retaining ring having a resilient marginal portion engaging said flange of said sealing ring, and a collar abutting against said washer, said collar being rabbeted to receive said flange of said supporting ring and said sealing ring.

SAMSON M. WECKSTEIN.